United States Patent
Hutchinson, Jr. et al.

(10) Patent No.: US 12,434,924 B2
(45) Date of Patent: *Oct. 7, 2025

(54) STACKING RING FOR CHAIR BASES

(71) Applicant: Medway Plastics Corporation, Long Beach, CA (US)

(72) Inventors: Thomas A. Hutchinson, Jr., Coto De Caza, CA (US); Richard E. Hutchinson, Lakewood, CA (US); Gerald A. Hutchinson, Austin, TX (US)

(73) Assignee: Medway Plastics Corporation, Long Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,392

(22) Filed: Dec. 15, 2023

(65) Prior Publication Data

US 2024/0217759 A1 Jul. 4, 2024

Related U.S. Application Data

(60) Division of application No. 17/249,602, filed on Mar. 5, 2021, now Pat. No. 11,851,294, which is a continuation of application No. 16/553,634, filed on Aug. 28, 2019, now Pat. No. 10,941,009, which is a continuation of application No. 15/848,448, filed on Dec. 20, 2017, now Pat. No. 10,435,254, which is a continuation of application No. 15/172,719, filed on
(Continued)

(51) Int. Cl.
A47C 7/00 (2006.01)
A47C 4/02 (2006.01)
B65B 35/50 (2006.01)
B65G 57/00 (2006.01)
B65G 57/20 (2006.01)

(52) U.S. Cl.
CPC ............ *B65G 57/005* (2013.01); *A47C 4/02* (2013.01); *A47C 7/004* (2013.01); *B65B 35/50* (2013.01); *B65G 57/20* (2013.01); *Y10T 403/55* (2015.01)

(58) Field of Classification Search
CPC .......... A47C 4/02; A47C 7/004; B65B 35/50; B65G 57/005; B65G 57/20; Y10T 403/55
See application file for complete search history.

(56) References Cited

U.S. PATENT DOCUMENTS 3,031,227 A * 4/1962 Buren, Jr. ............... A47C 3/04
297/DIG. 2
3,651,934 A * 3/1972 Roberts .................. B65D 85/62
206/326

(Continued)

OTHER PUBLICATIONS

Canadian Office Action of, Jun. 26, 2020 for Canadian Patent Application No. 2,916,235. 6 pages.

*Primary Examiner* — Philip F Gabler
(74) *Attorney, Agent, or Firm* — Knobbe Martens Olson & Bear LLP

(57) ABSTRACT

A stacking ring for a chair base may be disposable between a first and second chair base such that the stacking ring generally prevents lateral movement of the first chair base relative to the second chair base. The stacking ring may be integrally formed to the chair base, or separate and disposable between at least two chair bases. The stacking ring may substantially prevent rotation of a first chair base relative to a second chair base.

14 Claims, 6 Drawing Sheets

Related U.S. Application Data

Jun. 3, 2016, now Pat. No. 9,878,858, which is a continuation of application No. 14/307,843, filed on Jun. 18, 2014, now Pat. No. 9,357,848.

(60) Provisional application No. 62/004,351, filed on May 29, 2014, provisional application No. 61/838,089, filed on Jun. 21, 2013.

(56) References Cited

U.S. PATENT DOCUMENTS

| | | | | |
|---|---|---|---|---|
| 4,084,776 A | * | 4/1978 | Cook | A47C 7/004 248/188.7 |
| 4,170,297 A | * | 10/1979 | Johnson | B65D 85/62 206/326 |
| 4,534,533 A | | 8/1985 | Doerner | |
| 4,598,892 A | * | 7/1986 | Franckowiak | A47C 3/24 248/188.7 |
| 4,709,894 A | | 12/1987 | Knoblock | |
| 4,821,986 A | | 4/1989 | White | |
| 5,249,768 A | * | 10/1993 | Edwards | A47C 7/004 108/150 |
| 5,377,943 A | | 1/1995 | Perl | |
| 5,595,039 A | * | 1/1997 | Lowery | E04C 5/206 52/678 |
| 5,608,960 A | | 3/1997 | Nyhuis | |
| 5,692,715 A | | 12/1997 | Hertel | |
| 5,906,343 A | * | 5/1999 | Battey | A47C 7/006 248/188.7 |
| 5,964,436 A | * | 10/1999 | Battey | A47C 7/004 248/188.7 |
| D458,060 S | | 6/2002 | Vo | |
| D458,776 S | | 6/2002 | Patton | |
| 6,478,374 B1 | * | 11/2002 | Sinoway | A47C 3/04 297/239 |
| 6,848,586 B1 | | 2/2005 | Guliner | |
| 7,032,747 B2 | * | 4/2006 | Boche | B65D 71/0096 206/326 |
| 7,032,869 B2 | * | 4/2006 | Edwards | A47C 7/004 248/188.7 |
| 7,188,811 B2 | * | 3/2007 | Liviero | A47C 7/004 248/188.7 |
| 7,992,937 B2 | | 8/2011 | Plikat | |
| 8,696,056 B2 | * | 4/2014 | Corcorran | A47C 7/70 297/173 |
| 9,357,848 B2 | | 6/2016 | Hutchinson, Jr. | |
| 9,878,858 B2 | | 1/2018 | Hutchinson, Jr. | |
| D819,996 S | | 6/2018 | Woller | |
| D820,612 S | | 6/2018 | Woller | |
| D835,426 S | | 12/2018 | Woller | |
| 10,435,254 B2 | | 10/2019 | Hutchinson, Jr. | |
| 10,941,009 B2 | | 3/2021 | Hutchinson, Jr. | |
| 11,851,294 B2 | * | 12/2023 | Hutchinson, Jr. | A47C 4/02 |
| 2004/0104143 A1 | | 6/2004 | Boche | |
| 2008/0184652 A1 | * | 8/2008 | Kodi | E04C 5/206 52/649.1 |
| 2008/0224521 A1 | * | 9/2008 | Topping | A61G 15/005 297/338 |
| 2011/0187164 A1 | | 8/2011 | Corcorran | |
| 2012/0222317 A1 | * | 9/2012 | Rohrer | D01G 1/04 30/300 |
| 2016/0353887 A1 | * | 12/2016 | Lu | A47C 7/62 |

* cited by examiner

STACKING RING FOR CHAIR BASES

CROSS-REFERENCE TO RELATED APPLICATIONS

This application is a continuation of U.S. application Ser. No. 17/249,602, filed Mar. 5, 2021, which is a continuation of U.S. application Ser. No. 16/553,634, filed Aug. 28, 2019, which is a continuation of U.S. application Ser. No. 15/848, 448, filed Dec. 20, 2017, which is continuation of U.S. application Ser. No. 15/172,719, filed Jun. 3, 2016, which is a continuation of U.S. application Ser. No. 14/307,843 filed Jun. 18, 2014, which claims priority under 35 U.S.C. § 119 to U.S. to Provisional Patent Applications: U.S. Application No. 61/838,089 filed Jun. 21, 2013, titled, "STACKING RING FOR CHAIR BASES"; and U.S. Ser. No. 62/004,351 filed May 29, 2014, titled, "STACKING RING FOR CHAIR BASES." The entire contents of any and all items referenced in the paragraph above are hereby incorporated herein for all purposes, for that they contain.

BACKGROUND

Field of the Invention

The invention generally relates to features on a chair that allow certain shipping configurations.

Description of the Related Art

The bases of chairs ("chair bases") are often made from a plastic or metal material, and are frequently manufactured in one location and shipped to a second location to be assembled with the other parts of the chair. The chair bases must arrive to the assembly location in a presentable condition and not be damaged in transport. Chair bases that have been damaged may not be used in the assembly process and are often discarded as unusable. Therefore, it is important for the chair bases to be transported in a sufficiently safe and stable environment that prevents damage.

Chair bases often have multiple arms that extend from a central location, with many chair bases having five extending arms. The arms often extend radially outward from the central location, but also angle downward. This configuration is also aesthetically pleasing to the user.

In the past, in order to protect the chair base during shipping, companies typically put a single chair base in a single box. Shipping chair bases in a box is advantageous because it takes an unusually shaped object and hides it in a rectangular box that can be easily stacked. These boxes are often stacked on pallets and shipped via trucks. Boxes also offer a measure of protection to the chair bases because they are relatively stable and rarely shift to a point where the boxes fall over. However, this method of shipping chair bases has at least three distinct disadvantages. First, there is a lot of empty space within a box that is not being taken up by its contents. In this case, the unusual shape of the chair base, which often includes 5 arms, is very different from the rectangular box leaving unused space. Second, the boxes add extra weight to the shipment. The shipper is only concerned about shipping the chair bases and only ships the boxes as a means for protecting the chair bases. Finally, the boxes add unnecessary waste. After the chair bases arrive at their target destination the boxes are either discarded or recycled. The boxes add unnecessary waste to the local landfill or at the very minimum, add extra cost to the shipment.

Thus, there is a need for a method of shipping chair bases that adequately protects the bases from surface and structural wear, but that also does not add unnecessary cost and weight to the process.

SUMMARY

The systems, methods and devices described herein have innovative aspects, no single one of which is indispensable or solely responsible for their desirable attributes. Without limiting the scope of the claims, some of the advantageous features will now be summarized.

In various embodiments, a chair base may be modified to facilitate a new and improved shipping configuration such that there is a reduced or no need for cardboard or cardboard boxes. In some embodiments, a chair base comprises a hub and a plurality of arms extending at least radially from the hub. The hub may be generally cylindrical or frustoconical shaped. The top of the hub may comprise an orifice and may be configured to accept a component of the chair, such as a vertical shaft that is attached to the seat portion. The bottom of the hub of the chair base may comprise a ring and be configured such that at least part of the ring of a first chair base may be disposed within at least part of the top of the hub of a second chair base.

In some embodiments, the bottom of the hub of the second chair base may be disposed within at least part of the top of the hub of a third chair base. This system may be continued until a sufficient number of chair bases have been engaged. A plurality of chair bases may be serially stacked such that the hub of a first chair base engages the hub of a second chair base. The chair bases within the stack may be arranged such that the arms of the first chair base are generally lined up with the arms of the second chair base. Plastic wrap or other flexible material, may be wrapped around the top of an arm of the first chair base and down around the bottom of an arm of the last chair base, such that the plastic wrap encloses at least part of all of the arms of the stack that are generally in line with each other. The result may be a chair base stack that is movable as a unit and comprises two or more chair bases whose arms are generally in line with each other.

In some embodiments, a chair base stack may be disposed generally horizontally on a pallet such that the line from the hub of the first chair base to the hub of the last chair base is generally horizontal. A second chair base stack may be disposed on the same pallet in generally the same orientation. Stacking of the chair base stacks may continue with additional chair base stacks being added to the pallet in a generally vertical direction with at least part of each chair base stack being disposed over at least part of the pallet. The chair base stacks may be disposed in such a configuration that at least part of a set of arms of a first chair base stack are disposed in the space between a set of arms of a second chair base stack. The process may continue until the chair base stacks on the pallet reach a desired height.

In some embodiments, a chair base stack may be disposed generally vertical on a pallet such that the line from the hub of the first chair base to the hub of the last chair base is generally vertical. A second chair base stack may be disposed on the same pallet in generally the same orientation. Stacking of the chair base stacks may continue until the pallet is sufficiently full, resulting in a first layer of chair base stacks. A second layer of chair base stacks may be created by disposing a chair base stack on top of the first layer of chair base stacks, already disposed on the pallet. This stacking may be continued until there is no more room on top of the first layer. Additional layers may be added as desired. Additionally, a separator may be placed between the first and second layers of chair base stacks.

In some embodiments, a stack of chair base stacks, which are disposed on a single pallet, may be wrapped in plastic wrap or other flexible material such that the plastic wrap keeps the chair base stacks from shifting during movement of the pallet. The pallet containing the chair base stacks may be loaded on to a truck or other mode of transportation and shipped to a second location.

In some embodiments, a stacking ring, separate from the chair base may be disposable between at least two chair bases, such that the two chair bases may not move substantially laterally from one another. The stacking ring may be generally cylindrical or frustoconical shaped and may have a plurality of sections that allow disposal into or around one or more parts of the chair bases. The stacking ring may comprise a top portion configured to insert into a first chair base, a bottom portion configured to insert into a second chair base, and a middle portion that may be configured to prevent the stacking ring from disposed too far into the first or second chair base. The stacking ring may comprise a piece configured to prevent the first chair base from substantially rotating relative to the second chair base. Or, the portions may be configured to go around part of a chair base to generally serve the same or similar function.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Like reference numbers and designations in the various drawings indicate like elements. Not all of the elements of the drawings are in to scale relate to other drawings and the comparative size of one element relative to another element in the drawings is not necessarily indicative of the relative sizes of the elements in one or more embodiments.

DETAILED DESCRIPTION

Figure 1:
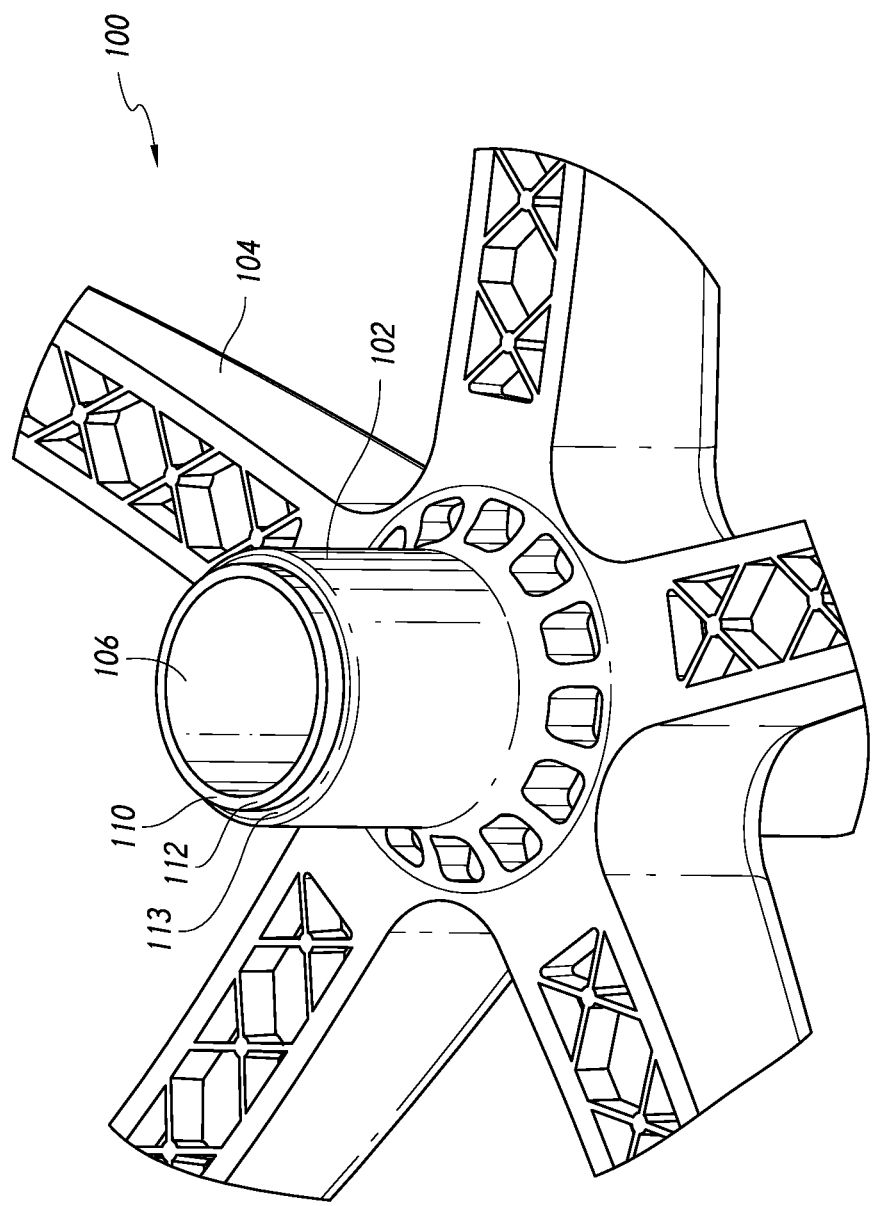
FIG. 1 is a bottom perspective view of a chair base.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Elements that are described as "connected," "engaged," "attached," or similarly described, shall include being directly and/or indirectly connected, engaged, attached, etc. Alterations and further modifications of the inventive features illustrated herein, and additional applications of the principles of the inventions as illustrated herein, which would occur to one skilled in the art and having possession of this disclosure, are to be considered within the scope of the invention.

Descriptions of unnecessary parts or elements may be omitted for clarity and conciseness, and like reference numerals refer to like elements throughout. In the drawings, the size and thickness of layers and regions may be exaggerated for clarity and convenience.

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description" one will understand how illustrated features serve to explain certain principles of the present disclosure.

Figure 2:
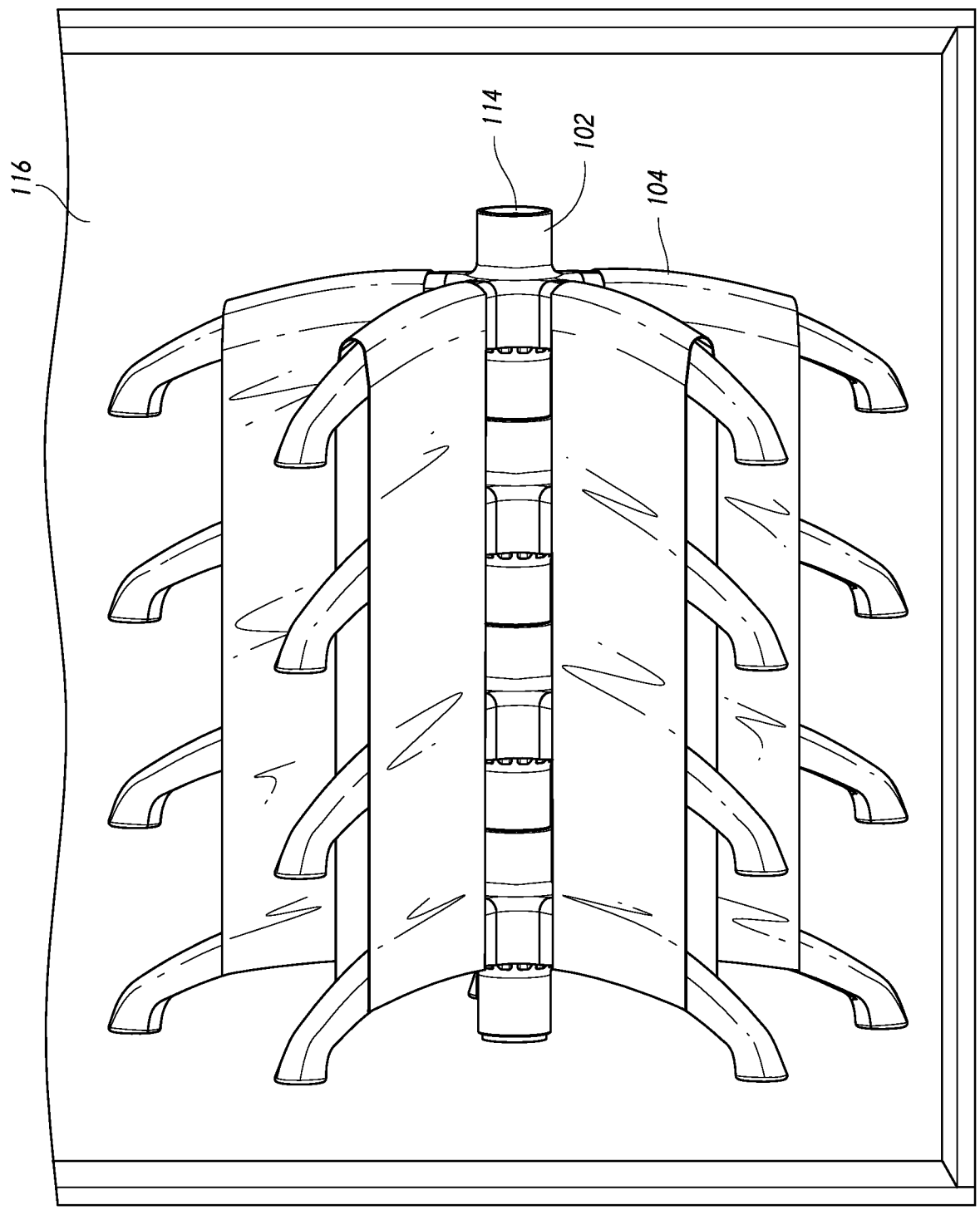
FIG. 2 is a side view of a plurality of chair bases stacked together.

In some embodiments, a chair base 100 may comprise a hub 102 and a plurality of arms 104, as shown in FIGS. 1 and 2. Portions of the hub 102 may be generally cylindrical or frustoconical shaped. The center of the hub 102 may comprise an orifice 106 in order to accept other portions of the chair assembly; or, the hub 102 may comprise other structures. A plurality of arms 104 may extend from the hub 102. The arms 104 may extend radially and to some degree in a downward direction, as depicted in FIG. 2. The outward ends of the arms 104 may be configured to accept a foot or a caster that will eventually rest on the ground once the chair is more fully assembled.

The hub 102 may be several inches in diameter and several inches in height. In some embodiments, the outside diameter of the hub 102 is between 1 and 8 inches; in some embodiments, the outside diameter of the hub 102 is between approximately 3 and 4 inches. In some embodiments, the height of the hub 102 is between approximately 2 and 8 inches. The arms 104 may be several inches long and may be long enough to adequately support a user once the chair is more fully assembled. The chair base 100 may be made from plastic, metal, or other generally durable material. The base 100 may be formed by various manufacturing means, including injection molding, casting, machining, press-fitting, etc. The hub 102 and arms 104 may be integrally formed, or may be made separately and later assembled.

As shown in FIG. 1, the bottom of the hub 102 may comprise a ring 110. The ring 110 on the bottom of a first chair base 100 may be placed in the top of the hub 102 of a second chair base 100. Additional chair bases 100 may be added such that a plurality of chair bases 100 becomes stacked in a series, as shown in FIG. 2. The ring 110 may be integrally formed with the hub 102, or may be added after the hub 102 has already been formed. The ring 110 may be generally cylindrical or frustoconical shaped with generally vertical walls. The bottom surface of the ring 112 may be generally flat or may comprise another shape. The inside of the hub 102 may comprise a shape that is at least partially conducive to reception of another chair part, such as a vertical tube (not shown) that extends up to the chair's seat portion. The ring 110 of a first hub 102 may be formed such that when the ring 110 is placed in the top of a second hub 102, the ring 110 substantially prevents the first hub 102 from being displaced laterally relative to the second hub 102. In some embodiments, the ring 110 is formed such that two engaged hubs 102 require little force to become disengaged. In another embodiment, the ring 110 is formed such that the two engaged hubs 102 require some force to become disengaged. The bottom of the hub 102 may be formed such that there is a substantially horizontal portion adjacent the ring 110; or the portion next to the ring 110 may be angled or slanted. The portion 113 adjacent the ring 110, may be configured to abut the second hub 1032 and may prevent the first hub 102 from being disposed too far into the second hub 102. The hub 102, arms 104, and ring 110 may be integrally formed, or may be made separately and later assembled.

Figure 3:
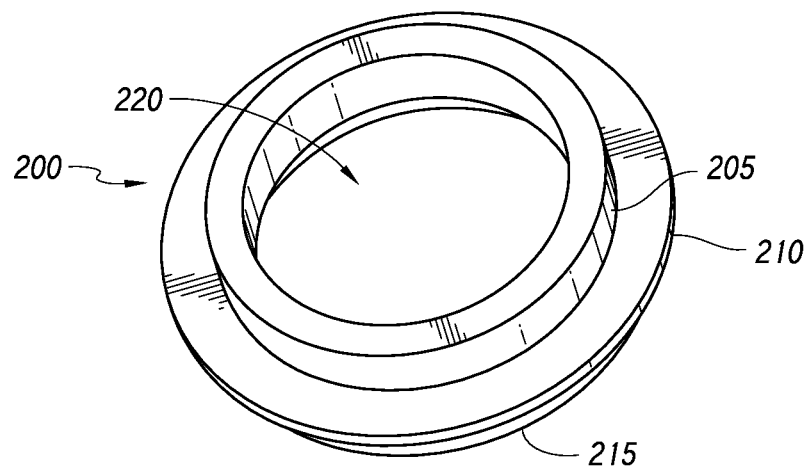
FIG. 3 illustrates a perspective view of a first embodiment of a stacking ring for chair bases.
Figure 4:
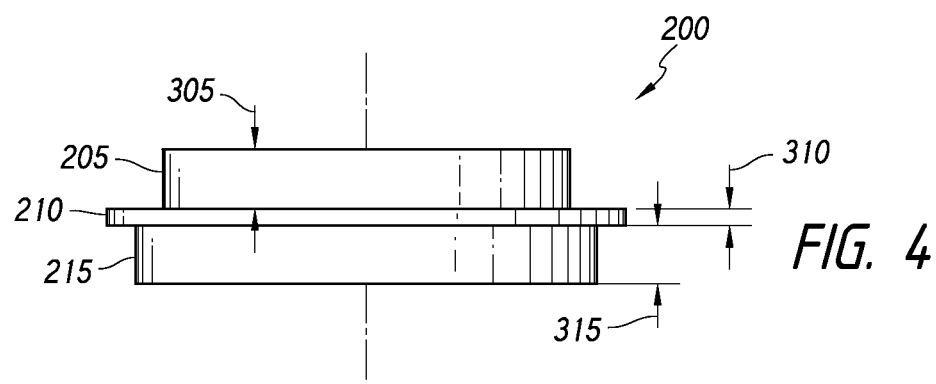
FIG. 4 illustrates a side view of the first embodiment of a stacking ring for chair bases.
Figure 5:
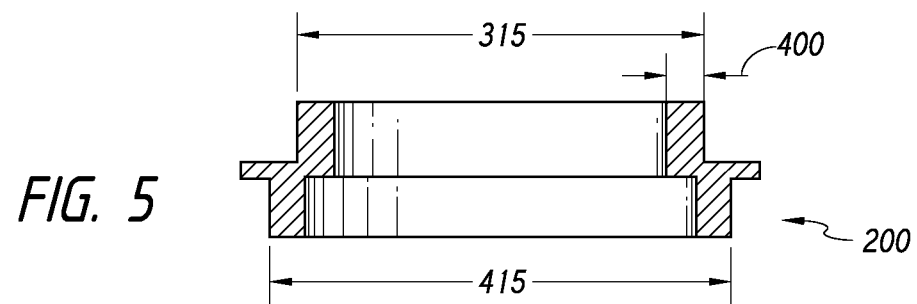
FIG. 5 illustrates a sectional view of the first embodiment of a stacking ring for chair bases.

In some embodiments, the bottom of the hub 102 is flat or comprises no ring 110 feature. Instead, as shown in FIGS. 3-5, in some embodiments, the stacking ring 200 comprises a generally annular shape, comprising a top portion 205, a middle portion 210, and a bottom portion 215, and may be separate from the chair base. The top portion 205, the middle portion 210, and the bottom portion 215 may be disposed generally coaxial to one another. The top portion 205 may comprise an annular ring comprising a wall thickness 400, an inside diameter, and an outside diameter 405. The top portion 205 may be adjacent the middle portion 210. The middle portion 210 may comprise an annular ring comprising an inside diameter and an outside diameter. The middle portion 210 may be adjacent the bottom portion 215. The bottom portion 215 may comprise an annular ring comprising a wall thickness, an inside diameter, and an outside diameter 415. The top portion 205 may further comprise a height 305; the middle portion 210 may further comprise a height 310; and the bottom portion 215 may further comprise a height 315. In some embodiments, the height 305 of the top portion 205 and the height 315 of the bottom portion 215 may be the same or similar, and may be larger than a height 310 of the middle portion 210. In some embodiments, the outside diameter 405 of the top portion 205 may be smaller than the outside diameter 415 of the bottom portion 215, which may be smaller than the outside diameter of the middle portion 210. In some embodiments, the inside diameter of the top portion 205 is the same or similar to the inside diameter of the middle portion 210, which may be smaller than the inside diameter of the bottom portion 215. In some embodiments, the wall thickness 400 of the top portion 205 may be the same or similar to the wall thickness of the bottom portion 215. In some embodiments, the stacking ring 200 defines a hole or aperture 220 that goes substantially or all the way through the stacking ring 200. In some embodiments (not shown), the stacking ring 200 does not define a hole or aperture 220. The exact dimensions of the stacking ring 200 may be influenced, at least in part, by the chair bases to which the stacking ring 200 is to be attached, and the scope of the invention is not limited by the absolute or relative sizes of any portions of the stacking ring.

In some embodiments, the top portion 205, middle portion 210, and bottom portion 215 may be integrally formed, or may be produced in parts and later assembled. The stacking ring 200 may comprise a material such as plastic, nylon, metal, wood, or other material that may adequately form the desired structure. The stacking ring 200 may be produced through casting, machining, forging, or other various production methods.

A first stacking ring 200 may be used by being placed in between a first chair base 100 and a second chair base 100 such that the first stacking ring 200 is generally coaxial with a hub 102 of the first chair base 100 and a hub 102 of the second chair base 100. A second stacking ring 200 may be placed between a hub 102 of the second chair base 100 and a hub 102 of a third chair base 100. Additional stacking rings 200 and chair bases 100 may be similarly configured. In some embodiments, the top portion 205 of a stacking ring 200 may be configured to be disposed or disposable within an opening 106 of a hub 102 of a chair base 100. For instance, the outside diameter 405 of the top portion 205 may be the same size as, or smaller than, and inside diameter of a bottom portion of a chair base hub. The outside diameter 415 of a bottom portion 215 of a stacking ring 200 may be the same size as, or smaller than, and inside diameter of a top portion of a chair base hub 102. In these configurations, the top portion 205 may be disposed within at least part of the bottom portion of the chair base hub 102; and the bottom portion 215 may be disposed within at least part of the top portion of the chair base hub 102.

In some embodiments, using a stacking ring 200 that is disposable between two or more chair base hubs 202 may be advantageous. For instance, as a non-limiting example, there may be no need, or minimal need, to redesign the molds used to create chair bases. The stacking rings 200 may be configured to fit in or between a wide variety of chair bases, or multiple sizes of stacking rings 200 may be produced that can fit between different sized chair base hubs. Stacking rings 200 may be manufactured by a third-party and purchased by a chair base manufacturer, alleviating the need for the chair base manufacturer to produce a part necessary for serially assembling chair base hubs for transport. The stacking rings 200 may be configured to be reusable, and may be recovered after the chair bases have reached their destination for assembly. The stacking rings 200 may be gathered and returned to the chair base manufacturer for use in transport with a second batch of chair bases.

In some embodiments, an outside diameter 405 of the top portion 205 may be between 1.5 inches and 2 inches, or may be approximately 1.75 inches. A height 305 of the top portion 205 may be between approximately 0.1 inches and 2 inches, or may be approximately 0.25 inches. An outside diameter 315 of the bottom portion 115 may be between approximately 1.75 inches and 2.25 inches, or may be approximately 2 inches. A height 215 of the bottom portion 115 may be between approximately 0.1 inches and 2 inches, or may be approximately 0.25 inches. A height 310 of the middle portion 210 may be between approximately 0.01 inches and 0.5 inches, or may be approximately 0.06 inches. In some embodiments, the heights and diameters of the portions of the stacking ring 200 may be sized to be disposable within at least part of a hub 102 of a chair base 100, and therefore may be larger or smaller than the given dimensions, depending on the dimensions of the chair base 100. For instance, as a non-limiting example, if an inside diameter of a chair base 100 is 3 inches, one or more of the outside diameters 405, 415 of a stacking ring 200 may be approximately 3 inches or less. The heights of the portions of a stacking ring 200 may also be configured to fit within the various sized chair bases 200, and may deviate from the dimensions given, depending on the dimensions of the chair base 100. For instance, as a non-limiting example, it may be advantageous for the middle portion 210 to be 1 inch in height or more, depending on the configuration of the chair base 100. The dimensions of the stacking ring 200 may be scalable for various applications, and the scope of the invention is not limited by the exact dimensions of the stacking ring 200. Various dimensions of the stacking ring 200 may be larger or smaller than those given without deviating from the scope of the invention.

In some embodiments the stacking ring 200 may comprise a feature to help prevent or discourage a first chair base 100 from rotating axially relative to a second chair base 100. Since the chair bases 100 may be secured to one another using at least plastic wrap or other material, the chair bases 100 may have a tendency to rotate relative to one another. It may be beneficial to generally prevent the chair bases 100 from rotating in order that the arms 104 of the chair bases 100 generally align, creating a more efficient interaction with other stacks of chair bases 100. See, e.g., FIG. 2.

Figure 6:
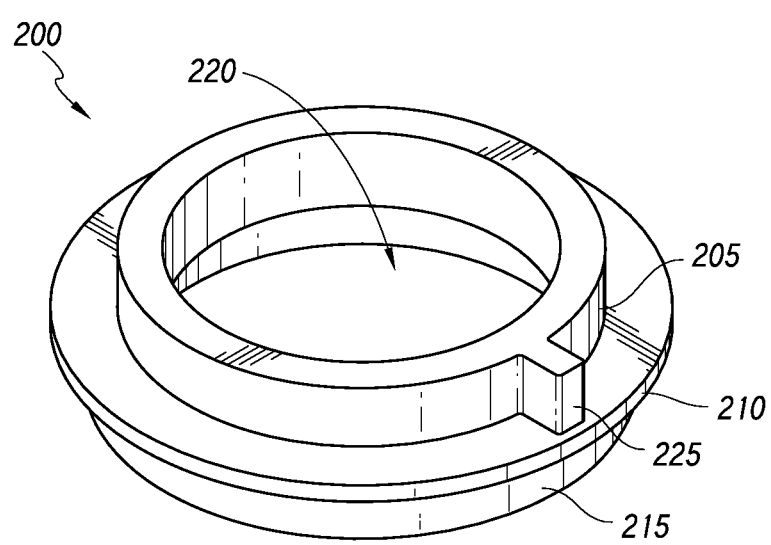
FIG. 6 illustrates a perspective view of a second embodiment of a stacking ring for chair bases.

In some embodiments, the feature 225 may be a protrusion, a recess, a male part, a female part, or some other shape or contour that may interact with a portion of a chair base 100, such that the stacking ring 200 generally prevents rotational movement of the chair base 100. As shown in FIG. 6, the feature may comprise a protrusion 225 that may interact with a corresponding recess on a chair base 100. When the stacking ring 200 engages a first chair base 100, the protrusion 225 may engage a recess in the first chair base 100. Thus, when a rotational force is applied to the first chair base 100, the force may be at least partially transmitted to the stacking ring 200 via the protrusion 225, such that when first chair base 100 rotates, the stacking ring 200 may generally rotate at the same rate. In some embodiments, a recess on a chair base 100 may be disposed only partially through the chair base hub 102. In some embodiments, a recess on a chair base 100 may span the thickness of the chair base hub 102.

The stacking ring 200 may comprise a first protrusion 225 and a second protrusion (not shown). The first protrusion 225 may be disposed on the top of the stacking ring 200, while the second protrusion may be disposed on the bottom of the stacking ring 200. When the stacking ring 200 engages a second chair base 100, the second protrusion may engage a recess in the second chair base 100. Thus, when the stacking ring 200 engages both a first and second chair base 100, and a rotational force is applied to the first chair base 100, the rotational force may be transmitted to the second chair base 100 via the stacking ring 200 and the first 225 and second protrusions. In these configurations, the first and second chair bases 100 may generally be prevented or discouraged from rotating independent of one another. However, a stacking ring 200 need not completely prevent a first chair base 100 from rotating independent of a second chair base 100, and the scope of the invention is not limited to embodiments where the stacking ring 200 completely prevents the first chair base 100 from rotating relative to the second chair base 100.

In some embodiments, the stacking ring 200 comprises a first and second recess (not shown) configured to interact with protrusions on a first and second chair base 100. In some embodiments, the stacking ring 200 may comprise one protrusion and one recess that interact with a corresponding recess and protrusion respectively. In some embodiments, the stacking ring 200 may comprise a plurality of protrusions and/or recesses. The protrusion 225 on a stacking ring 200 may comprise various shapes and dimensions and the scope of the invention is not limited by the shape and dimensions of the protrusion 225. For instance, a protrusion 225 on a stacking ring 200 may engage or connect to the top portion 205 and the middle portion 210. In some embodiments, the height of the protrusion 225 is approximately the same height as the top portion 205; or, the protrusion 225 may be taller or shorter than the top portion 205. In some embodiments, the protrusion 225 may extend radially from the top portion 205 to approximately the edge of the middle portion 210; or, the protrusion 225 may extend farther than or short of the middle portion 210. In some embodiments, the protrusion 225 may contact the top portion 205 and not contact the middle portion 210; or the protrusion 225 may contact the middle portion 210 and not contact the top portion 205. Other configurations may be possible and a person of ordinary skill in the art would recognize that the scope of the invention is not limited to the configurations described above.

As shown in FIG. 2, once a first hub 102 has been engaged to a second hub 102, additional hubs 102 and chair bases 100 may be engaged. The result may be a series of chair bases 114 that are engaged via their hubs. FIG. 2 depicts four chair bases 100 wherein the hubs 102 are disposed generally coaxially. Some embodiments comprise a ring 110 that has a smaller outer diameter than the hub 102 (shown in FIG. 1). Tnce multiple chair bases 100 have been engaged via the stacking ring 110, the stacking ring 110 may not be visible from a side profile view of the intersection of a first and second chair base 100 (shown in FIG. 2). In some embodiments, once the hubs 102 are engaged, but before any part of the stack 114 is wrapped in plastic wrap, the chair bases 100 may still be able to rotate about the hub 102. The arms 104 of the chair bases 100 may be aligned such that one arm 104 of each chair base 100 may be wrapped with a plastic wrap or other flexible material. The second arms 104 of all chair bases 100 in the stack 114 may then be wrapped with the same material. This may be continued until all arms 104 have been wrapped with the arms 104 above or below it. The result may be a chair base "stack" 114 that can be moved and manipulated as a single unit. Since plastic wrap surrounds one set of arms 104 of the chair base stack 114, the plastic wrap may substantially prevent a first chair base 100 from rotating independently from a second chair base 100. This chair base stack 114 also includes a space between the wrapped arms 104. The plastic wrap may function to keep the plurality of chair bases 100 together and prevent them from moving in various directions. The plastic wrap may also help to prevent damage to the surface of the chair bases 100 by protecting the surface. The plastic wrap may also help to prevent damage to the chair bases 100 by creating additional friction between the chair base stacks 114 and substantially preventing them from shifting during transport.

Figure 7:
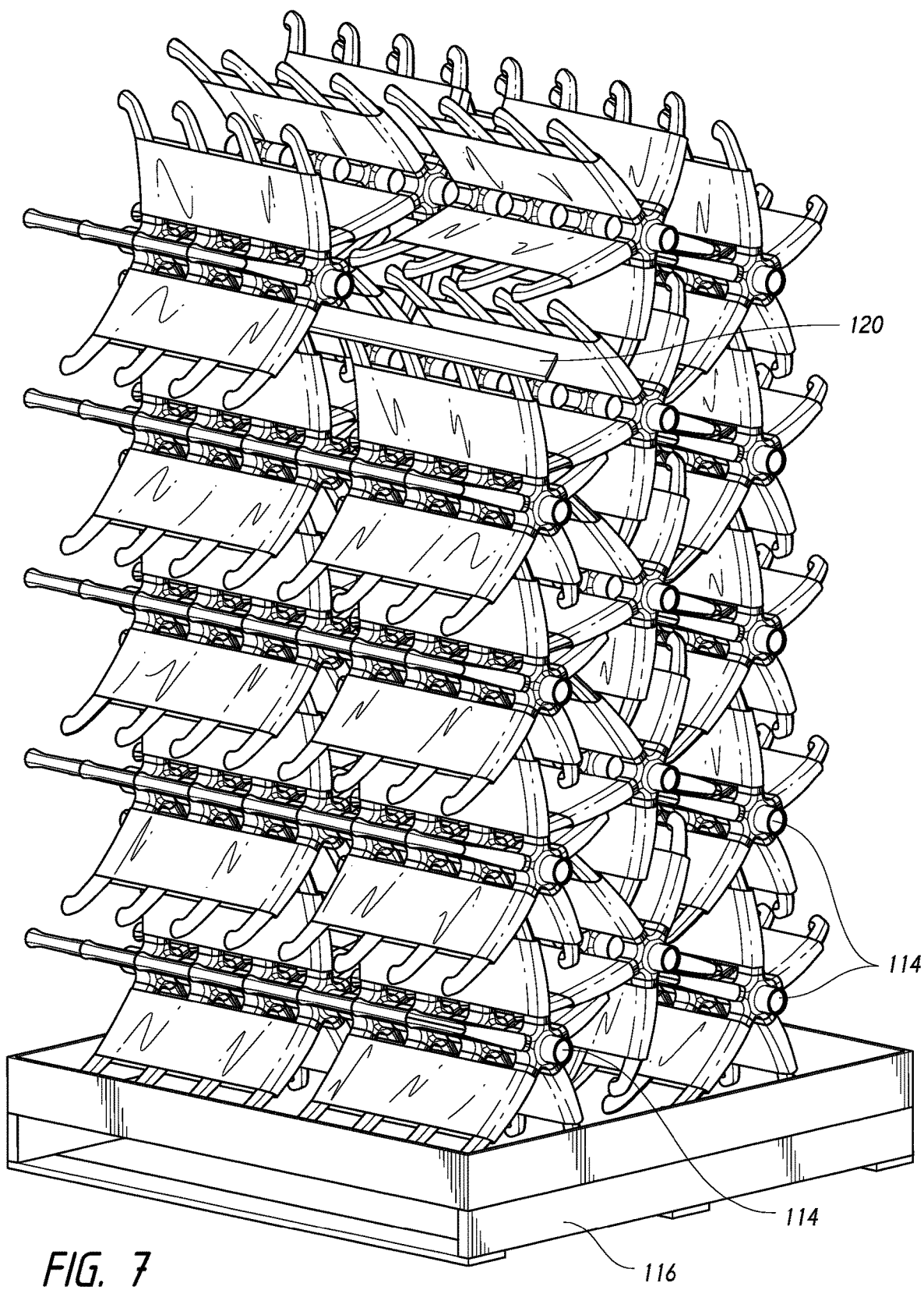
FIG. 7 is a side view of a plurality of chair bases stacked together on a shipping pallet.

Once the chair base stacks 114 have been created, multiple stacks 114 may be placed on a shipping pallet 116, in preparation for transportation to a different location. FIG. 7 shows a plurality of stacks 114 positioned on a pallet 116. In some embodiments, the stacks 114 are placed horizontally on a pallet 116. The arms 104 of one stack 114 may be placed between the arms 104 of a second stack 114. Several stacks 114 may be placed on a pallet 116 in a generally vertical fashion. Elongated pieces of wood, cardboard, or other structurally sound material 120 may be placed between the stacks 114 during assembly and/or during transport. The elongated pieces 120 may help the loading and unloading process, or may provide additional structural support or protection to the chair bases 100.

In some embodiments (not shown), the chair base stacks 114 may be placed vertically on the pallet 116 to create a first layer of stacks 114. Subsequent layers of stacks 114 may be added on top of the first layer of stacks 114. Cardboard or other similar material 120 may be inserted between the stacks 114 to help add stability or damage resistance.

Figure 8:
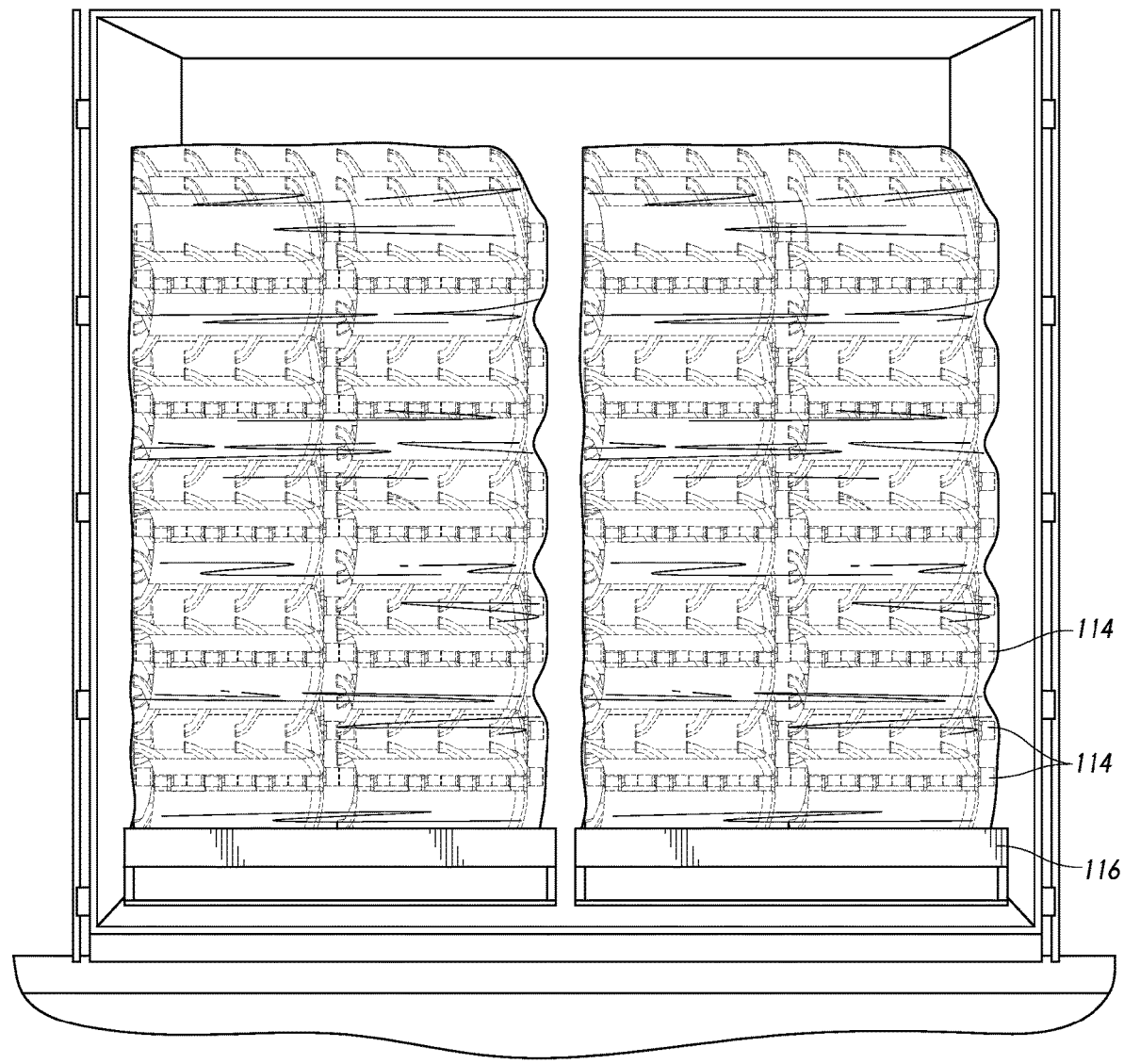
FIG. 8 is a side view of a plurality of chair bases stacked together on a shipping pallet and wrapped in plastic wrap.

Once the stacks of chair bases 114 have been assembled onto a pallet 116, the pallet 116 may be wrapped with plastic wrap or otherwise secured such that there is minimal movement of the chair bases 100 during transport, and loaded onto or into a shipping container, as shown in FIG. 8. The plastic wrap may also help to prevent damages to the chair bases 100. The plastic wrap may also help prevent dust and debris from settling on the chair bases 100 during transport as well as loading, unloading, and during storage.

The configuration of chair bases 100 and chair base stacks 114 may be advantageous because it reduces or eliminates the need for excessive cardboard during the transportation phase of chair production and assembly. Typically, cardboard boxes have been used to protect the chair bases 100 during transport, and create a uniform shape which is more conducive to stacking. However, cardboard costs money to purchase and dispose. Cardboard also adds unnecessary weight to the shipment. Using a square cardboard box that houses a chair base 100 (which often comprises 5 arms), also creates a lot of unused space within the four-sided box.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. Additionally, other implementations are within the scope of the following claims. In some cases, the actions recited in the claims can be performed in a different order and still achieve desirable results.

In describing the present technology, the following terminology may have been used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims that follow.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Conjunctions, such as "and," "or" are used interchangeably and are intended to encompass any one element, combination, or entirety of elements to which the conjunction refers.

What is claimed is:

1. A method of preparing chair base stacks for transportation, the method comprising:
   preparing a chair base stack having a vertical stacking direction, by
      inserting a co-engagement ring of a first chair base hub into an orifice of a second chair base hub, wherein a plurality of arms extends outward, in a direction transverse to the stacking direction, from each of the first chair base hub and the second chair base hub;
   placing a first chair base stack on a transportation platform; and
   placing a second chair base stack on the transportation platform such that the plurality of arms extending outward from the first chair base stack and the plurality of arms extending outward from the second chair base stack are laterally interspersed.

2. The method of claim 1, further comprising placing a third base chair stack on the transportation such that a plurality of arms extending outwards from the third chair base stack are laterally interspersed between the plurality of arms extending outward from the second chair base stack and the plurality of arms extending outward from the first chair base stack.

3. The method of claim 1 further comprising placing a structurally sound material between the first chair base stack and the second chair base stacks.

4. The method of claim 3, wherein the structurally sound material comprises cardboard or an elongated piece of wood.

5. The method of claim 1, wherein preparing a chair base stack further comprises inserting the co-engagement ring of the second chair base hub into an orifice of a third chair base hub.

6. The method of claim 1, comprising wrapping the first chair base stack with a material to prevent movement of a first chair base relative to a second chair base.

7. The method of claim 1, wherein preparing a chair base stack further comprises engaging a feature of the co-engagement ring of the first chair base hub with a recess of the second chair base hub thereby preventing rotation of a first chair base relative to a second chair base.

8. The method of claim 7, wherein the feature of the co-engagement ring of the first chair base hub comprises a protrusion.

9. The method of claim 8, wherein preparing a chair base stack further comprises rotating the first chair base hub relative to the second chair base hub until the protrusion of the first chair base hub is aligned with the recess the second chair base hub.

10. The method of claim 7, wherein the engaging feature of the first chair base hub is engaged with the recess of the second chair base hub such that the plurality of arms extending outward from the first chair base hub and the plurality of arms extending outward from the second chair base hub are substantially vertically aligned and the first chair base stack and the second chair base stack are placed closely adjacent to each other on the transportation platform such that vertically aligned stacks of chair base hubs are laterally separated by less than one and a half arm-lengths.

11. The method of claim 1, wherein inserting a co-engagement ring of a first chair base hub into an orifice of a second chair base hub comprises inserting a co-engagement ring of the first chair base hub a threshold distance until a surface of the first chair base hub contacts an end surface of the second chair base hub.

12. The method of claim 1, wherein the co-engagement ring of the first chair base hub is integrally formed with the first chair base hub.

13. The method of claim 1, wherein the co-engagement ring and orifice provide an interlocking structure such that first chair base stack and the second chair base stack can each be manipulated as a unit and tipped over such that each is placed on the transportation platform horizontally.

14. The method of claim 1 further comprising transporting the transportation platform with the first chair base stack and the second chair base stack secured thereto.

* * * * *